United States Patent [19]

Miano et al.

[11] 4,152,497

[45] May 1, 1979

[54] COMPOUNDS CONTAINING THE 2,2,2-TRICHLOROETHYL GROUP AS FLAME RETARDANTS FOR POLYURETHANES

[75] Inventors: Jeffrey D. Miano, Norristown; Stanley R. Sandler, Springfield, both of Pa.

[73] Assignee: Pennwalt Corporation, Philadelphia, Pa.

[21] Appl. No.: 890,358

[22] Filed: Mar. 27, 1978

[51] Int. Cl.$^2$ ............................................... C08J 9/00
[52] U.S. Cl. .................................... 521/164; 521/163; 521/166; 521/171; 521/172; 521/174; 521/176; 521/188; 521/110; 521/127
[58] Field of Search .............. 260/2.5 AC, 2.5 BB, 260/2.5 AJ, 2.5 AM; 521/163, 164, 166, 171, 172, 174, 176, 188, 110, 127

[56] References Cited

U.S. PATENT DOCUMENTS

| | | | |
|---|---|---|---|
| 2,877,193 | 3/1959 | Roussel | 260/2.5 BB |
| 3,124,543 | 3/1964 | Fowler | 260/2.5 BB |
| 3,243,389 | 3/1966 | Möller | 260/2.5 AC |
| 3,244,754 | 4/1966 | Bruson | 260/2.5 AM |
| 3,352,822 | 11/1967 | Yamadera | 260/2.5 BB |
| 3,420,787 | 1/1969 | Reymore | 260/2.5 AM |
| 3,437,680 | 4/1969 | Farrissey | 260/2.5 AJ |
| 3,519,680 | 7/1970 | Wismer | 260/2.5 AM |
| 3,663,506 | 5/1972 | Knopf | 260/2.5 BB |
| 3,821,132 | 6/1974 | Mao | 260/2.5 AM |
| 3,880,782 | 4/1975 | Rambosek | 260/2.5 AM |

*Primary Examiner*—Melvyn I. Marquis

[57] ABSTRACT

Flame retarded polyurethane foams are prepared from a reaction mixture comprising as the flame retardant additive a compound containing 2,2,2-trichloroethyl group.

12 Claims, No Drawings

COMPOUNDS CONTAINING THE 2,2,2-TRICHLOROETHYL GROUP AS FLAME RETARDANTS FOR POLYURETHANES

BACKGROUND OF THE INVENTION

1. Field of the Invention

This invention relates to a flame retarded polyurethane foam. This foam is prepared by adding to the reaction mixture a derivative compound of urea, thiourea, or sulfamide containing the 2,2,2-trichloroethyl group.

2. Description of the Prior Art

Prior to the instant invention polyurethane foam was normally flame retarded by incorporating phosphorous and/or halogen containing compounds into the formulation. Three such commercial flame retardants, which are chloroalkyl phosphates, are disclosed in U.S. Pat. Nos. 3,171,819, 3,817,881 and 3,192,242. Since these flame retardants are non-reactive additives, they are not permanently bound into the polymer and, hence, have the tendency to migrate to the surface of the foam resulting in a loss of flame retardancy.

Another commercial flame retardant for polyurethane foam is 2,3-dibromo-2-butene-1,4-diol which is described in U.S. Pat. Nos. 3,919,166 and 4,022,718. The disadvantages of this material are its relatively high costs and its poor processibility at high loadings.

The compounds of the present invention overcome the disadvantages of the prior art because they react with the isocyanates used in preparing the polyurethane and thus become permanently bound to the polymer. There is, therefore, no loss in the flame retardancy of foams which contain the compounds of the present invention due to flame retardant migration or aging. The compounds of this invention also are made from inexpensive raw materials, are more effective at lower levels than commercial products, are soluble in the polyols, and do not adversely affect foam properties or processing parameters.

STATEMENT OF THE INVENTION

The present invention is directed to a flame retarded polyurethane foam prepared from a reaction mixture which comprises a flame retarding amount of a compound having formula (I) or (II):

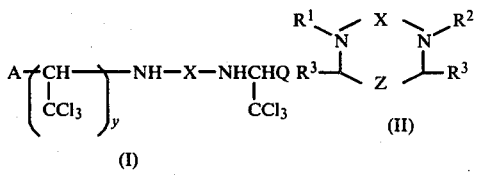

wherein:
X is selected from

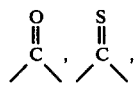

or $-SO_2-$;
y is an integer of 0 or 1;
Z is a covalent bond or oxygen;
when y is 0, A is hydrogen and Q is selected from the group consisting of $-OH$,

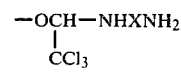

where X is defined as above;
when y is 1, A and Q are $-OH$;
when Z is a covalent bond, $R^1$ is hydrogen or

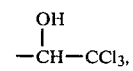

$R^2$ is

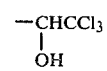

and $R^3$ is hydrogen; and,
when Z is oxygen, $R^1$ and $R^2$ are hydrogen and $R^3$ is $-CCl_3$.

DETAILED DESCRIPTION OF THE INVENTION

The present invention is directed to a flame retarded polyurethane foam. The most common types of polyurethanes are formed by the reaction of toluene diisocyanate (TDI) or polymethylene polyphenylisocyanate or mixtures thereof, with polyfunctional hydroxy compounds. The flame retardant additives described in this invention are effective as flame retardants for hot cure flexible polyurethane foam, high-resiliency polyurethane foam, rigid polyurethane foam, and rigid polyurethane/isocyanurate foam copolymers. These additives are especially effective as flame retardants for high-resiliency (HR) polyurethane foam made from special polyols which allow the foam to cure at ambient temperatures without external heat. This cold cure process provides for lower molding costs and faster production cycles; it also produces foams with higher load ratios and greater tear strengths than foams made by the conventional hot cure process.

The flame retardant additives used to prepare the polyurethane foams of this invention may be prepared by the reaction of urea, thiourea, or sulfamide with chloral or chloral hydrate following the method of Chattaway and James [*Proceedings of the Royal Society, Volume A* 134, page 372 (1931)]. The nitrogen-containing compound is stirred with chloral or chloral hydrate in a solvent at 25° to 150° C., preferably 70° to 90° C., to afford the desired composition. These compositions may be optionally converted to ether-containing compositions by treatment with a base followed by addition of acetic anhydride. Solvents that may be used in these reactions include water, ether, benzene, toluene and tetrahydrofuran. Catalysts that may be used to increase the rate of reaction between chloral and the nitrogen-containing compound include hydrochloric acid, sulfuric acid, acetic acid or boron trifluoride etherate.

These compositions are added to the reactants for preparing the polyurethane foams in the amount of 0.25 to 30 parts per 100 parts of the polyol (php) component by weight to impart flame retardancy. The preferred loading in high-resiliency polyurethane foam is 0.5 to 2.0 php by weight.

Representative flame retardant additives used in this invention are as follows:

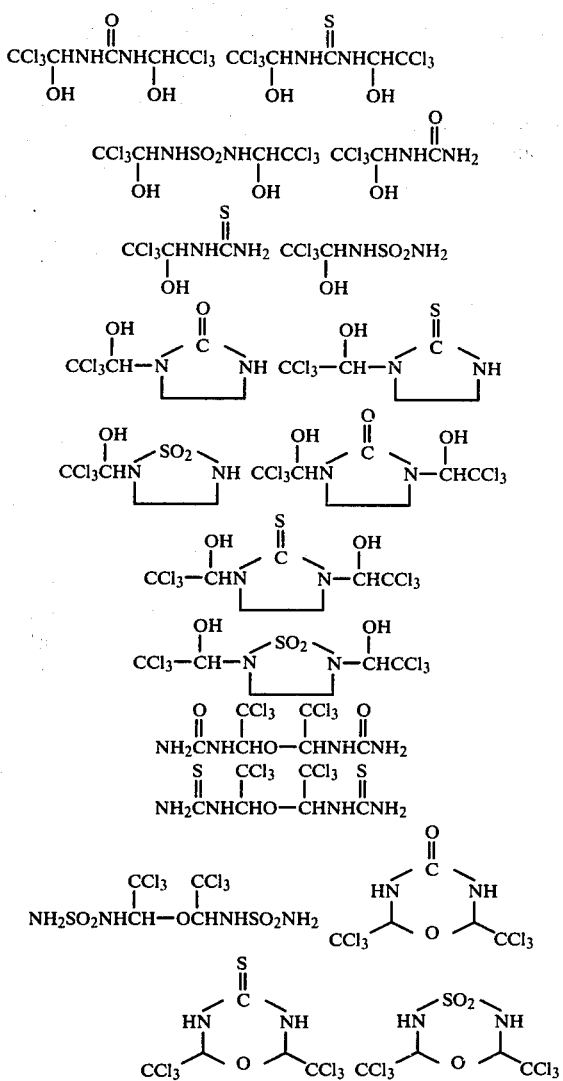

The preferred additives for use as flame retardants in polyurethane foam are:

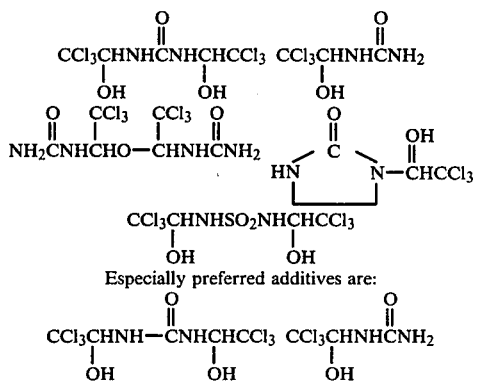

The flame retardant additives used in this invention may also be further reacted with various unsubstituted or halogen substituted epoxides to increase the molecular weight of the flame retardant and/or increase the halogen content. Epoxides useful for these purposes include ethylene oxide, propylene oxide, 3,3,3-trichloro-1,2,-propylene oxide, and 4,4,4-trichloro-1,2-butylene oxide. Representative structures for such reaction products are:

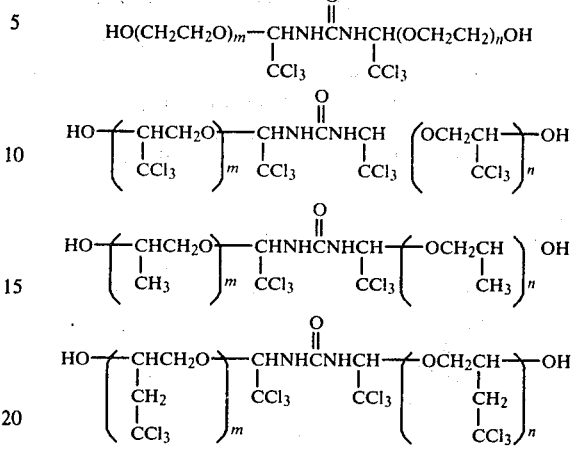

where m and n are integers with values of 1–10.

The following Examples illustrate the present invention but are not intended to limit the invention thereto.

Polyurethane foams described in the following examples are made by dissolving the flame retardant additive in the polyol followed by addition of catalysts, surfactant, water and/or blowing agent and isocyanate as described by K. C. Frisch and S. L. Reegan in "Advances in Urethane Science and Technology," Vol. 1–4, Technomic, Conn., 1971–1976. In the case of flexible foams this mixture is stirred by a high-speed mixer and is poured into a 13" × 13" × 5" mold which may or may not be clamped shut. After the reaction is completed, the foam is removed and aged at room temperature for at least seven days (conventional hot cure foams are cured at 110° C. for ½ hour prior to aging). Rigid foams are made by pouring the stirring reaction mixture into an 8" × 8" × 5" box and allowing the reaction to proceed under "free rise" conditions. The physical properties of the flexible foams are then evaluated using ASTM D-2406-73 and the flame retardant properties of both flexible and rigid foams are evaluated using ASTM D-1692-74 and/or ASTM D-2863-74.

EXAMPLE 1

Preparation of Bis(1-hydroxy, 2,2,2-trichloroethyl)urea

This compound has previously been prepared by Chattaway and James [*Proc. Roy. Soc.*, A134 372 (1931)]. A mixture of chloral (162.2 g, 1.1 mole), H$_2$O (100 ml), and concentrated HCl (150 ml) was stirred at 70°–80° C. Urea (30 g, 0.5 moles) was added all at once and the resulting mixture was stirred for 5 hours. The white precipitate which formed was filtered, and then washed with water until the pH of the wash water was 7. The product was then recrystallized from aqueous EtOH to give white needles; 57% yield, m.p. 193°–194° C.

Infrared and nmr spectra and elemental analysis of the compound were consistent with the assigned structure:

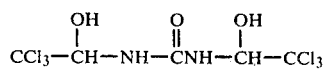

Anal. Calcd.: C, 16.9; H, 1.70; N, 7.90; Cl, 60.0; Found: C, 17.3; H, 1.95; N, 8.27; Cl, 58.8.

EXAMPLES 2-3

A high-resiliency polyurethane foam was prepared using the composition of Example 1 and its flame retardant and physical properties compared to a foam containing no flame retardant additives. These results are shown in Table 1.

Example 2 shows that without flame retardant additives, the high-resiliency polyurethane foam is totally consumed (5 inches) in the ASTM D-1692 test. Example 3 shows that when only 1 part of the composition from Example 1 is incorporated into a similar 100%-TDI-based high-resiliency formulation, the flame retardancy is markedly increased without adversely affecting the physical properties of the foam.

Table 1

| Composition | Example 2 | Example 3 |
|---|---|---|
| Voranol 4701 (Dow)[1] | 60 | 60 |
| Niax 34-28 (Union Carbide)[2] | 40 | 40 |
| Composition from Example 1 | — | 1.0 |
| Silicone Surfactant DCF 1-1630 (Dow Corning) | 0.04 | 0.04 |
| Water | 2.7 | 2.7 |
| Diethanolamine | 1.5 | 1.5 |
| Dabco 33LV Catalyst[3] (Air Products) | 0.3 | 0.3 |
| Niax A-1 Catalyst (Union Carbide)[4] | 0.12 | 0.12 |
| Niax A-4 Catalyst (Union Carbide)[5] | 0.3 | 0.3 |
| T-12 Catalyst (M & T)[6] | 0.03 | 0.03 |
| Toluene diisocyanate (80/20 mixture of 2,4/2,6 isomers) | 35.5 | 36.1 |
| Isocyanate Index | 105 | 105 |
| % Example 1 Composition | — | 0.7 |
| % Cl | — | 0.4 |
| Physical Properties | | |
| Density (core, lb/ft$^3$) | 2.36 | 2.46 |
| ILD[7] | | |
| 25% (lb/50 in$^2$) | 33 | 35 |
| 65% (lb/50 in$^2$) | 84 | 88 |
| Sag Factor | 2.5 | 2.5 |
| Flame Retardant Properties | | |
| Oxygen Index (ASTM D-2863) | | |
| Initial | 22.1 | 23.2 |
| After DHA[8] | 21.6 | 23.2 |
| ASTM D-1692 [Extent of Burn (in.)] | | |
| Initial | 5.0 | 2.9 |
| After DHA[8] | 4.0 | 2.3 |

[1]Polyether polyol, molecular weight approx. 5000, functionality 3, primary OH groups.
[2]Polymer polyol
[3]33% Triethylene diamine, 67% Dipropyleneglycol
[4]70% Bis(dimethylaminoethyl)ether, 30% Diluent
[5]33% Dimethylamino dimethyl propionamide, 67% Diluent
[6]Dibutyltin dilaurate
[7]Sample dimensions were 5"×13"×13".
[8]Under dry heat aging conditions, 1 week at 70° C. (158° F.).

EXAMPLES 4-7

High-resiliency polyurethane foams prepared using the composition of Example 1, Stauffer's Fyrol CEF, [Tris (2-chloroethyl)phosphate], and GAF's 2,3-dibromo-2-butene-1,4-diol were compared to a foam containing no flame retardant additives. The results are shown in Table 2.

Example 4 shows that a high-resiliency foam which contains no flame retardant additive is totally consumed (5-inch burn) in the ASTM D-1692 flammability test. Examples 5-7 show that 1 part of the flame retardant composition of Example 1 is as effective as 3 parts of non-reactive tris(2-chloroethyl) phosphate (Stauffer's Fyrol CEF) or 2 parts of reactive 2,3-dibromo-2-butene-1,4-diol (GAF). In addition, Examples 5-6 also show that the foam containing the reactive composition of Example 1 still retains its flame retardancy after dry-heat aging whereas the foam containing the non-reactive tris(2-chloroethyl) phosphate becomes more flammable.

Table 2

| Composition | Ex. 4 | Ex. 5 | Ex. 6 | Ex. 7 |
|---|---|---|---|---|
| Pluracol 538 (BASF)[1] | 60 | 60 | 60 | 60 |
| Pluracol 581 (BASF)[2] | 40 | 40 | 40 | 40 |
| Composition from Example 1 | — | 1.0 | — | — |
| Fyrol CEF (Stauffer)[3] | — | — | 3.0 | — |
| 2,3-Dibromo-2-butene-1,4-diol (GAF) | — | — | — | 2.0 |
| Silicone Surfactant DCF 1-1630 (Dow Corning) | 0.04 | 0.04 | 0.04 | 0.04 |
| Water | 2.7 | 2.7 | 2.7 | 2.7 |
| Dabco 33LV Catalyst[4] (Air Products) | 0.3 | 0.3 | 0.3 | 0.3 |
| Niax A-1 Catalyst[5] (Union Carbide) | 0.12 | 0.12 | 0.12 | 0.12 |
| Niax A-4 Catalyst[6] (Union Carbide) | 0.3 | 0.3 | 0.3 | 0.3 |
| T-12 Catalyst (M & T)[7] | 0.03 | 0.03 | 0.03 | 0.03 |
| Niax SF-58 (Union Carbide)[8] | 34.9 | 35.5 | 34.9 | 36.5 |
| Isocyanate Index | 103 | 103 | 103 | 103 |
| % Example 1 Composition | — | 0.7 | — | — |
| % Fyrol CEF[3] | — | — | 2.1 | — |
| % 2,3-dibromo-2-butene 1,4-diol | — | — | — | 1.4 |
| % Cl | — | 0.4 | 0.8 | — |
| % P | — | — | 0.2 | — |
| % Br | — | — | — | 0.9 |
| Physical Properties | | | | |
| Density (overall, lb/ft$^3$) | 2.67 | 2.66 | 2.79 | 2.70 |
| ILD[9] | | | | |
| 25% (lb/50 in$^2$) | 38 | 37 | 42 | 42 |
| 65% (lb/50 in$^2$) | 94 | 93 | 95 | 107 |
| Sag Factor | 2.5 | 2.5 | 2.3 | 2.5 |
| Flame Retardant Properties | | | | |
| ASTM D-1692 (Extent of Burn, in.) | | | | |
| Initial | 5.0 | 2.7 | 3.8 | 3.8 |
| After DHA[10] | 5.0 | 2.9 | 5.0 | 2.9 |

[1]Polyether polyol containing primary OH groups, OH number = 35
[2]Polymer polyol
[3]Tris (2-chloroethyl)phosphate
[4]33% Triethylenediamine, 67% Dipropylene glycol
[5]70% Bis(dimethylaminoethyl)ether, 30% Diluent
[6]33% Dimethylamino dimethylpropionamide, 67% Diluent
[7]Dibutyltin dilaurate
[8]80% (80/20 mixture of 2,4/2,6 toluene diisocyanate), 20% polymeric isocyanate
[9]Sample Dimensions 5" × 13" × 13"
[10]Under Dry Heat Aging Conditions, 1 week at 70° C. (158° F.)

EXAMPLES 8-9

Examples 8-9 in Table 3 show that the composition of Example 1 decreases the extent of burn in ASTM D-1692-74 and thereby increases the flame retardancy of conventional hot-cure flexible polyurethane foam.

Examples 8-9 were prepared using the following conventional "hot-cure" formulation:

| | Parts by Weight |
|---|---|
| Poly G-30-56[1] (Olin) | 100.0 |
| H$_2$O | 3.5 |
| DC-191[2] (Dow Corning) | 1.6 |
| Dabco 33LV[3] (Air Products) | 0.3 |
| T-9 (M & T)[4] | 0.15 |
| Additive (Example 9) | 10.0 |
| TDI[5] (Index 105) | 49.7 |

[1]Polyether polyol, molecular weight = 3,000, OH number = 56
[2]Silicone surfactant
[3]33% Triethylenediamine, 67% Dipropyleneglycol
[4]Stannous octoate
[5]80/20 mixture of 2,4/2,6 toluene diisocyanate

TABLE 3

| Example | Additive | ASTM D-1692 (Extent of Burn-in.) |
|---|---|---|
| 8 | None | 5.0 |
| 9 | Example 1 Composition | 2.6 |

EXAMPLE 10

Preparation of 1-Hydroxy, 2,2,2-Trichloroethyl Urea

This compound was previously prepared by Chattaway and James [Proc. Roy. Soc., A134, 372 (1931)]. Urea (360 g, 6.0 moles) and chloral (442.5 g, 3.0 moles) were stirred in 1200 ml of water at room temperature for 3 days. The white precipitate that formed was then filtered, washed with water, and dried; yield 513.6 g (83%), m.p. 153° C. (dec.) Lit. m.p. 150° (dec.). An infrared spectrum of the compound was consistent with the assigned structure:

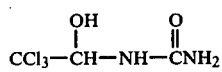

EXAMPLE 11

Preparation of Bis(1-Carbamido-2,2,2-trichloroethyl)ether

This compound was previously prepared by Chattaway and James [Proc. Roy. Soc., A134, 372 (1931)]. 1-hydroxy-2,2,2-trichloroethyl urea (the composition of Example 10) (207 g, 1.0 moles) was dissolved in 2000 ml of a 1.0N NaOH solution. Acetic anhydride (102 g, 1.0 moles) was added dropwise with stirring at a temperature of 0°–5° C. Bis(1-carbamido, 2,2,2-trichloroethyl)ether separated as a colorless flocculant solid on each addition of acetic anhydride. After addition of the acetic anhydride was complete, the solid was filtered, washed with H$_2$O and was dried to give 147.9 g (75%) of product with a m.p. of 205° C., Literature m.p. 222° C. (dec). An infrared spectrum and molecular weight analysis of the compound was consistent with the assigned structure:

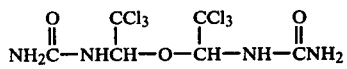

EXAMPLE 12

N(1-hydroxy, 2,2,2-trichloroethyl)ethylene urea

Ethylene urea (43 g, 0.5 moles) was dissolved in water (400 ml). Chloral (73.5 g, 0.5 moles) was added dropwise with stirring. The reaction mixture was stirred at 70°–80° for 3 hours, cooled and was filtered to give a white solid with a m.p. of 153°–155° C. The infrared spectrum and analysis of this material were consistent with the structure:

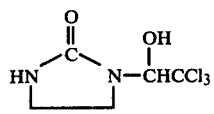

EXAMPLES 13–16

Examples 13–16 in Table 4 show that the compositions of Example 10–12 increase the limiting oxygen index (LOI) and thereby increase the flame retardancy of high-resiliency polyurethane foam.

Examples 13–16 contain the following formulations:

| | Parts by Weight |
|---|---|
| Pluracol 538 (BASF)[1] | 60.0 |
| Pluracol 581 (BASF)[2] | 40.0 |
| Water | 2.7 |
| Dabco 33LV Catalyst[3] (Air Products) | 0.3 |
| Niax A-1 Catalyst[4] (Union Carbide) | 0.12 |
| Niax A-4 Catalyst[5] (Union Carbide) | 0.3 |
| T-12 Catalyst (M & T)[6] | 0.03 |
| DCF 1-1630 Surfactant (Dow Corning) | 0.04 |
| Additive (Examples 10–12) | 1.0 |
| Niax SF-58[7] (Union Carbide) | 34.9 |
| Isocyanate Index | 103.0 |

[1]Polyether polyol primary OH groups, OH number = 35
[2]Polymer polyol
[3]33% Triethylene diamine, 67% Dipropylene glycol
[4]70% Bis(dimethylaminoethyl)ether, 30% Diluent
[5]33% Dimethylamino dimethylpropionamide, 67% Diluent
[6]Dibutyltin dilaurate
[7]80% (80/20 mixture of 2, 4/2, 6 toluene diisocyante), 20% polymeric isocyanate

TABLE 4

| Examples | Additive | LOI (ASTM D-2863-74) |
|---|---|---|
| Example 13 | None | 19.5 |
| Example 14 | Example 10 Composition | 20.8 |
| Example 15 | Example 11 Composition | 21.3 |
| Example 16 | Example 12 Composition | 20.8 |

EXAMPLE 17

Sulfamide (96 g, 1.0 moles) and chloral (295 g, 2.0 moles) were stirred in 500 ml tetrahydrofuran at 60° C. for 6 hours. The tetrahydrofuran was evaporated to give a beige solid product. Infrared and combusion analyses were consistent with the assigned structure:

EXAMPLE 18

Example 18 shows that the composition of Example 1 is reactive with toluene diisocyanate and therefore becomes permanently bound to the backbone of the polyurethane polymer when used as flame retardant additive in polyurethane foam.

The composition of Example 1 (17.75 g, 0.05 moles) was dissolved in 60 ml of tetrahydrofuran. Toluene diisocyanate (8.71 g, 0.05 moles) was then added and the solution was stirred at room temperature. Triethylamine (20 microliters) was added via a microliter syringe to catalyze the reaction. Gas phase chromatographic analysis indicated that the toluene diisocyanate in the reaction mixture disappeared after 15 minutes. The reaction mixture was evaporated to give a urethane derivative 26.2 g (100%), m.p. 130°–145° (dec.).

EXAMPLE 19

Example 19 shows that tris (2-chloroethyl) phosphate (Stauffer's Fyrol CEF) is unreactive when subjected to the conditions described in Example 16. This material therefore is not permanently bound to the backbone of the polymer when used as an additive in polyurethane foam.

Tris (2-chloroethyl)phosphate (14.3 g, 0.05 moles) and toluene diisocyanate (8.71 g, 0.05 moles) were stirred in 60 ml of tetrahydrofuran at room temperature. Triethylamine (20 microliters) was added via a microliter syringe. Gas chromatographic analysis indicated that the toluene diisocyanate did not react with the tris(2-chloroethyl) phosphate.

Examples 20–21 show that the compostion of Example 1 also has utility as a flame retardant for rigid polyurethane foam. Incorporation of 22 parts as shown in Example 21 gives reduced flame spread results when compared to that of Example 20 containing no additive as measured by ASTM D-1692.

Example 20

| Formulation: | |
|---|---|
| Poly G-71-530 (Olin)[1] | 100.0 |
| H$_2$O | 0.5 |
| Penncat 283 (Pennwalt)[2] | 3.0 |
| DC-193 (Dow Corning)[3] | 1.5 |
| Isotron 11 (Pennwalt)[4] | 50.0 |
| PAPI (Upjohn)[5] | 172.0 |

[1]Polyether polyol, OH number = 530, functionally = 4.5
[2]Catalyst
[3]Silicone Surfactant
[4]Fluorocarbon 11
[5]Polymeric isocyanate, NCO equivalent = 133

The foam gave a flame spread of 2.0 inches in ASTM D-1692-74.

EXAMPLE 21

Same formulation as Example 20 except 22 parts of the composition of Example 1 is added and a flame spread of 0.9 inches is obtained in ASTM D-1692-74.

EXAMPLE 22

The composition of Example 1 (22 parts) when added to the following polyester polyol based polyurethane formulation gave flame retardant results comparable to Example 21:

| Formulation: | |
|---|---|
| F50(Witco)[1] | 100 |
| Y6721 (Union Carbide)[2] | 1.0 |
| N-Ethylmorpholine[3] | 2.3 |
| H$_2$O | 3.6 |
| TDI[4] | 46.0 |

[1]Glycol-adipate polyester polyol, OH number = 53
[2]Silicone Surfactant
[3]Catalyst
[4]80/20 mixture of 2, 4/2, 6 toluene diisocyanate

What is claimed is:

1. Polyurethane foam prepared from a reaction mixture which comprises a flame retarding amount of a compound having formula (I) or (II):

$$A-[CH(CCl_3)-NH-X-NHCHQ]_y \quad R^3-N(X)-N(R^2)-Z-R^3 \quad (I) \quad (II)$$

wherein:
X is selected from $$\begin{array}{cc} O & S \\ \| & \| \\ -C-, & -C-, \end{array}$$

or $-SO_2-$;
y is an integer of 0 or 1;
Z is nothing or oxygen;
when y is 0, A is hydrogen and Q is selected from the group consisting of $-OH$, $$-OCH(CCl_3)-NHXNH_2$$

where X is defined as above;
when y is 1, A and Q are $-OH$;
when Z is nothing, $R^1$ is hydrogen or $$-CH(OH)-CCl_3,$$

$R^2$ is $$-CHCCl_3$$
$$|$$
$$OH$$

and $R^3$ is hydrogen; and,
when Z is oxygen, $R^1$ and $R^2$ are hydrogen and $R^3$ is $-CCl_3$.

2. The polyurethane foam of claim 1 wherein the compound is $$CCl_3CHNHCNHCHCCl_3$$ with OH, O(double bond), OH substituents 3. The polyurethane foam of claim 1 wherein the compound is $$CCl_3CHNHCNH_2$$ with OH, O substituents 4. The polyurethane foam of claim 1 wherein the compound is $$H_2NCNHCH(CCl_3)-O-CH(CCl_3)-NHCNH_2$$ with O, O substituents 5. The polyurethane foam of claim 1 wherein the compound is $$CCl_3CHNHSO_2NHCHCCl_3$$ with OH, OH substituents 6. The polyurethane foam of claim 1 wherein the compound is $$HN-C(=O)-N(CHCCl_3-OH)$$ (cyclic)

7. The polyurethane foam of claim 1 wherein the polyurethane foam is high-resiliency foam.

8. The polyurethane foam of claim 1 wherein the polyurethane foam is hot-cure flexible foam.

9. The polyurethane foam of claim 1 wherein the polyurethane foam is rigid foam.

10. The polyurethane foam of claim 1 wherein the compound has formula (I) wherein X is

and A and B are —OH.

11. The polyurethane foam of claim 1 wherein the compound has formula (I) wherein X is —SO$_2$—.

12. The polyurethane foam of claim 1 wherein the compound has formula (II) wherein Z is oxygen.

* * * * *

UNITED STATES PATENT OFFICE
CERTIFICATE OF CORRECTION

Patent No. 4,152,497          Dated May 1, 1979

Inventor(s) Jeffrey D. Miano, Stanley R. Sandler

It is certified that error appears in the above-identified patent and that said Letters Patent are hereby corrected as shown below:

Column 12, line 6 reads:

"and A and B are -OH."

It should read:

-- and A and Q are -OH. --

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*